United States Patent [19]

Hearn

[11] Patent Number: 4,503,330

[45] Date of Patent: Mar. 5, 1985

[54] DETERMINING LEVEL OR TILT ANGLE OF SOLIDS IN A ROTATABLE CHAMBER

[75] Inventor: Daniel P. Hearn, Richardson, Tex.

[73] Assignee: Atlantic Richfield Company, Los Angeles, Calif.

[21] Appl. No.: 329,499

[22] Filed: Dec. 10, 1981

[51] Int. Cl.³ .............................................. G01F 23/00
[52] U.S. Cl. .................................................. 250/357.1
[58] Field of Search ....................... 250/357.1; 378/52; 432/32, 37

[56] References Cited

U.S. PATENT DOCUMENTS

| | | | |
|---|---|---|---|
| 2,323,128 | 6/1943 | Hare | 378/52 |
| 2,674,695 | 4/1954 | Grace | 250/357.1 |
| 2,714,167 | 7/1955 | Herzog | 250/357.1 |
| 3,170,064 | 2/1965 | Martin | 250/357.1 |
| 4,056,349 | 11/1977 | Parisis et al. | 250/357.1 |

*Primary Examiner*—Bruce C. Anderson

*Attorney, Agent, or Firm*—M. David Folzenlogen

[57] ABSTRACT

The level or tilt angle of the surface of a bed of solids in the round portion of an elongated rotatable chamber is determined by directing a collimated gamma ray beam transversely through the chamber to a scintillation radioactive count rate detector. The chamber is either horizontal or inclined from horizontal at an angle of less than 30°. At least three equal length transversely spaced apart radioactive scans or measurements with the source located at three different points are required. The scans must lie in approximately the same transverse plane and one of the scans must be transversely located between the other two scans. Best results are obtained when at least four scans are taken with the transverse plane of the scans perpendicular to the longitudinal axis of the chamber. The method will usually be applied at a number of axial points under dynamic conditions so that the contour of the bed may be plotted.

5 Claims, 4 Drawing Figures

DETERMINING LEVEL OR TILT ANGLE OF SOLIDS IN A ROTATABLE CHAMBER

BACKGROUND OF THE INVENTION

This invention relates to determining the level or tilt angle of particulate materials in an elongated, rotatable chamber, for example, a rotating oil shale retort.

There are many processes wherein particulate solids are passed through a rotating chamber, for example, an oven, retort, drier, screen, separator, or other similar type cylinder. When such chambers are designed or operated, it is desirable to know the bed depth and/or tilt angle of the solids as they flow through the chamber. Measurements of this type may be made by stopping rotation of the chamber and flow of the solids. The chamber is then physically entered to take the desired measurements; but there are many problems with taking the measurements in this manner. For example, physical access is sometimes difficult or hazardous. In addition, the bed is easily disturbed and the bed tends to slump.

SUMMARY OF THE INVENTION

A method is disclosed for determining the height and/or tilt angle of the surface of a bed of solids flowing through a horizontal or inclined elongated, rotatable chamber under both dynamic and static conditions without entering the chamber. The method may readily be applied at a number of points along the longitudinal axis of the chamber, thereby providing a profile of the surface of the solids throughout the chamber. In the method, a collimated gamma ray beam is directed transversely through the chamber to a scintillation radioactive count rate detector placed near an opposite side of the chamber. Radioactive transverse count rate scans are of equal length made with the collimated gamma ray source at different locations at at least three spaced apart points lying in approximately the same transverse plane. The number of scans or measurements taken depends on the method used to correlate the radiation scans with the level and/or tilt angle of the bed.

DETAILED DESCRIPTION OF THE PREFERRED EMBODIMENTS

Figure 1:
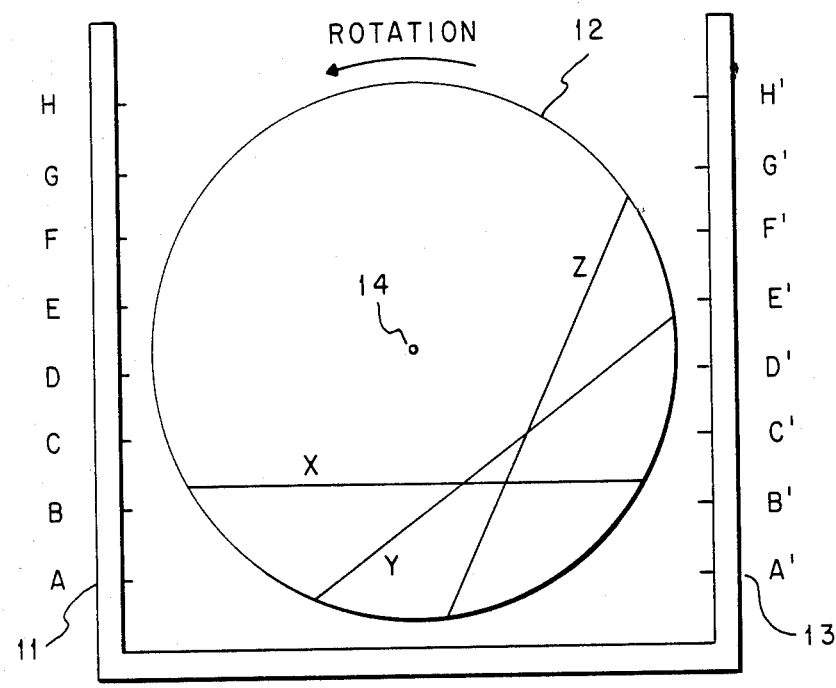
FIG. 1 represents the taking of a series of radially spaced radioactive count rate scans across a chamber through three different bed configurations.

The approximate location of the surface of a bed of particulate solids in the round portion of an elongated rotatable chamber is determined by taking a series of at least three properly oriented, properly located, transversely spaced apart radioactive count rate scans. The scans are taken with a collimated gamma ray source and count rate detector. The source is located at at least three different points. The straight line distance between the source and detector is the same for all of the scans. A chamber has a round cross section when the ratio of its shortest transverse dimension to its longest transverse dimension is at least as great as 0.9. A chamber is elongated when it has a central longitudinal axis at least as great as twice its longest transverse dimensions. The scans or measurements of this process are applicable to chambers whose angle to vertical is greater than 60°. In other words, the chamber is either horizontal or inclined from horizontal in a manner such that the solids do not simply fall through chamber.

In the drawings, the radioactive measurements are taken by locating gamma ray radioactive source 11 near one side of the round portion rotatable chamber 12. The source emits gamma rays transversely through the chamber toward scintillator 13 which is near the opposite side of chamber. The radioactive source is any sort of radioactive signal generator that emits a beam of radioactive energy whose protons or particles are absorbed or scattered, and thereby attenuated, by the presence of a bed of particulate solids in chamber 12. The amount of absorption or scattering depends on the relative density between the solids and the gaseous or vapor phase of the chamber and the relative locations of the source and detector. A suitable source of radioactivity is cobalt-60, radium 226 or cesium 137. The strength of the source will be adequate to provide distinguishable count rates between scans. It is expected that sources with an output of between 50 microcurie and 1 millicurie will be satisfactory for most purposes. The source is lead or tantalum shielded on all sides except for a hole to collimate a beam of gamma ray particles. Scintillator 13 is any sort of detector material that produces a light pulse when the detector material is struck by the radiation emitted by radioactive source 11, for example, a sodium iodide crystal is a common scintillation detector for the gamma rays emitted by cobalt-60, radium 226, or cesium 137. In typical fashion, the scintillator is adapted in the usual way to trigger a photomultiplier tube which in turn produces a pulse rate which corresponds to the rate at which radiation particles are received by the scintillation material. This pulse rate signal is fed to a count rate meter not shown. The level of this count rate is measured or recorded and plotted or analyzed in a way that the surface of a bed of particulate solids in chamber 12 is located.

Figure 3:
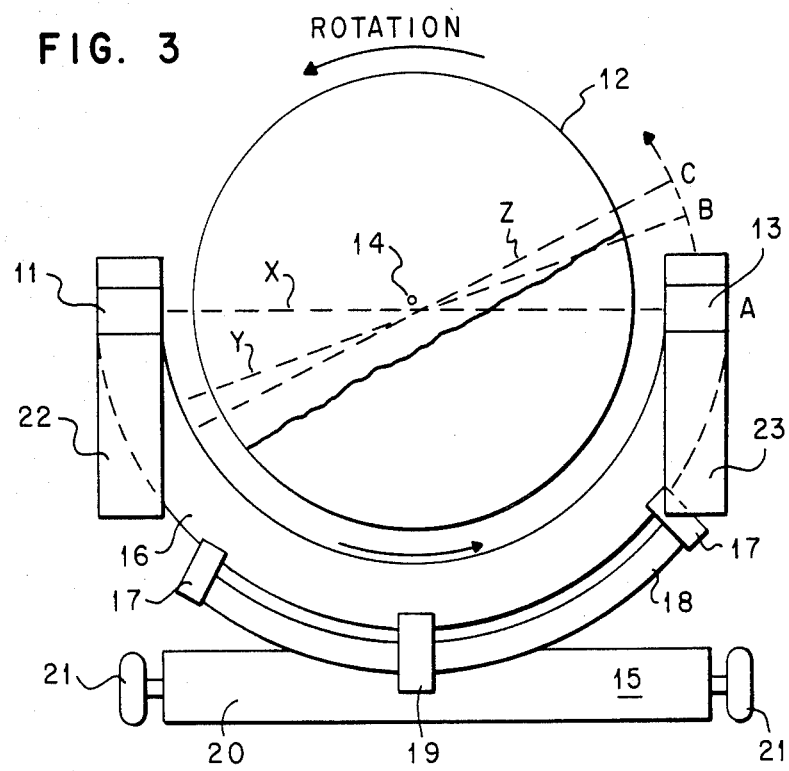
FIG. 3 represents a jig taking transverse radiation count rate scans at three circumferentially spaced points of a rotating chamber having a circular cross section.
Figure 4:
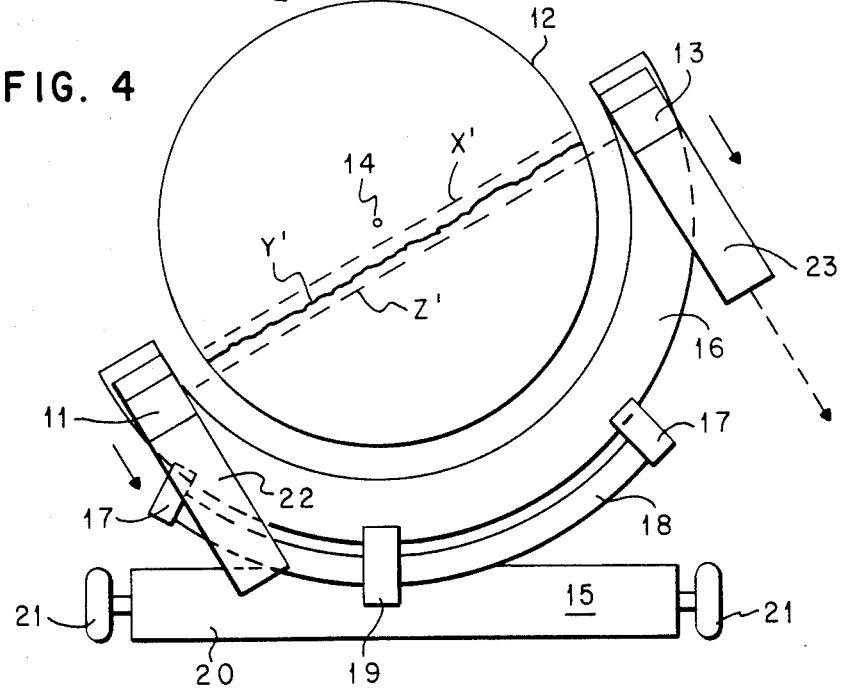
FIG. 4 represents the jig taking transverse scans at three radially spaced points at different locations relative to the cross-sectional diameter of a rotating chamber having a circular cross section.

In order to determine the location of the bed of solids at a given point in the chamber, it is necessary to make at least three transverse scans or measurements in approximately the same transverse plane. Better results are obtained if at least four scans are made. The scans may be taken and correlated in several ways. It, therefore, becomes necessary to use terminology which is generic to the types of scans that may be made. For this purpose, the scans will be called transverse scans. A scan is transverse when it passes through any part of the round portion of the chamber like the chord of a circle. Each transverse scan or measurement is transversely spaced from the other measurements. A scan is transversely spaced from another scan when it subtends a different segment of the perimeter of the chamber. In other words, the scans may be taken normal to a given diameter, but radially spaced at different points from the center axis of the chamber; or the scans may be taken at different angles to horizontal or vertical. The scans may be taken by moving the same source and detector, or by using more than one source and/or detector. For simplicity, only one source and one detector are used in this description of the invention. For example, in FIG. 1, a series of eight vertically or radially spaced, transverse scans or measurements are taken through points AA', BB', CC', DD', EE', FF', GG', and HH', respectively, through a chamber with three different bed configurations. Scans AA', BB', CC' and DD' are progressively taken toward longitudinal axis 14 of chamber 12. Scans EE', FF', GG' and HH' are progressively taken away from longitudinal axis 14. In FIG. 3, three circumferentially spaced, transversed scans or measurements X, Y and Z are taken at points A, B and C, respectively. In FIG. 4, three inclined radially spaced, transverse scans or measurements X', Y' and Z' are taken with Y' transversing and aligned with the surface of a bed of solids in chamber 12, and with X' aligned with and above the surface of the bed, and with Z' aligned with and below the surface of the bed.

As previously mentioned, at least three spaced apart transverse scans are required to determine the level or tilt of the bed of solids. The three scans need to lie in approximately the same transverse plane. This transverse plane does not need to be normal or perpendicular to the longitudinal axis of the chamber; but best results are obtained when the scans lie in a plane that is substantially normal or perpendicular to this longitudinal axis.

When the scans are parallel to the surface of the bed of solids, it is not necessary that one of the scans be taken in a manner such that a straight line between the source and detector passes through a portion of the bed because of the scattering effect of the bed. But when the scans are not parallel to the surface of the bed of solids, at least one of the transverse scans should be taken in a manner such that a straight line between the source and detector passes through a portion of the solids. Best overall results are obtained when one of the scans is on one side of the surface of the bed of solids and one of the scans is on the other side of the bed of solids. A scan is on one side of the surface of the bed of solids when a straight line between the source and detector does not pass through any of the solids in the bed, for example, scan GG' in FIG. 1 is above and on one side of all of the bed surfaces. Scan Z is above the surface of the bed of solids in FIG. 3 and scan X' is above the surface of the bed in FIG. 4. A scan is on the other side of the bed of surface when a straight line between the source and detector does not pass through any part of the chamber that does not contain solids, for example, scan BB' in FIG. 1 and scan Z' in FIG. 4.

The scans may be taken in any sequence and it is desirable to repeat the series of transverse scans at at least three spaced apart points along the longitudinal axis of the chamber.

Figure 2:
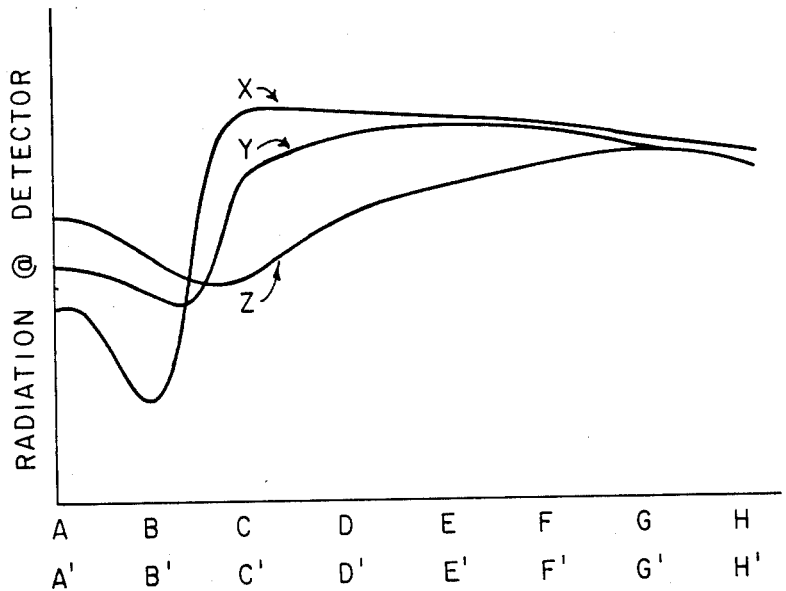
FIG. 2 shows a graphical plotting of the scans of FIG. 1.

One method of taking a series of scans or measurements and plotting them for correlation purposes is illustrated in FIGS. 1 and 2 wherein vertically spaced scans AA', BB', CC', DD', EE', FF', GG' and HH' are taken through three different bed configurations with surfaces X, Y and Z. The radiation count rate reaching the scintillator detector are plotted as curves X, Y and Z respectively. A family of curves like this may be plotted for different bed tilts or dips and for different bed levels or depths. This family of curves may be correlated with any three transversely spaced apart scans either visually or by computer curve matching techniques to locate or determine the desired characteristic of a bed of solids in rotatable chamber 12 under either static or dynamic conditions.

The series of transverse scans or measurements illustrated in FIGS. 3 and 4 show another way of finding the tilt of a bed of solids in rotating chamber 12 and then accurately locating the level of the surface of bed. The method uses jig 15 which allows radioactive source 11 and scintillator detector 13 to be rotated on arcuate arm 16 through an arc of 45° or more. Arm 16 is supported by members 17 which are mounted on rigid support 18. This rigid support is in turn held by clamp 19 which is affixed to cross member or carriage 20. Carriage 20 has wheels 21 and is adapted to be moved along the longitudinal axis of the round portion of rotatable chamber 12. Preferably, arcuate arm 16 will be aligned with a transverse plane that is perpendicular to longitudinal axis 14 of rotatable chamber 12 or carriage 20 will be adapted to move parallel to the longitudinal axis of the chamber on an inclined track not shown. This permits a series of scans to be taken at several axial positions. As shown, the radioactive source and scintillator detector are mounted on arms 22 and 23 respectively, which are adapted to move in unison radially away from or toward longitudinal axis 14.

In FIG. 3, jig 15 is first used to find the tilt of the surface of the bed of solids by taking transverse spaced apart scans X, Y and Z at circumferential points A, B and C respectively. This allows the operator to align the radioactive beam with the surface of the bed of solids as shown in FIG. 4.

Thereafter, a series of three transverse spaced apart scans X', Y' and Z' are taken by moving arms 24 and 25 radially or away from longitudinal axis 14. When the radioactive beam is parallel to the surface or to the top of the bed of solids, a slight displacement of source 11 and scintillator 13 changes the radiation received by the detector from a maximum as in scan X' to minimum as in scan Y' and the slope of the curve of radiation signal versus distance is greatest as shown in curve X of FIG. 2.

Reasonable variations and modifications are practical within the scope of this disclosure without departing from the spirit and scope of the claimed invention.

The embodiments of the invention in which an exclusive property or privilege is claimed are defined as follows:

1. A method for determining the approximate location of he subsurface of a bed of particulate solids in an elongated rotatable chamber having a central longitudinal axis that is at an angle of more than 60° to vertical, at least a portion of said chamber having a round cross section, comprising:
    (a) locating a collimated gamma ray radioactive source near a side of said round portion of said chamber at a first point and a count rate detector for gamma ray energy near a side of said round portion of said chamber in a manner such that a first straight line between said source and said detector is a transverse scan through said chamber, said first straight line between said collimated radioactive source and said detector being of determinable length, said transverse scan being at a first transverse point, passing gamma ray energy through said chamber, and measuring the count rate of said detector at said first transverse point;
    (b) locating a collimated gamma ray radioactive source near a side of said round portion of said chamber at a second point different from said first point and a count rate detector for gamma ray energy near a side of said round portion of said chamber in a manner such that a second straight line between said source and said detector is a transverse scan through said chamber, said second straight line between said collimated source and said detector having a determinable second length, said second length being the same as said first length of said first straight line, said transverse scan being at a second transverse point, said second transverse point being spaced transversely from said first transverse point, passing gamma ray energy through said chamber and measuring the count rate of said detector at said second transverse point, (c) locating a collimated gamma ray radioactive source near one side of said round portion of said chamber at a third point different from said first and said second points and a count rate detector for gamma ray energy near a side of said round portion of said chamber in a manner such that a third straight line between said source and said detector is a transverse scan through said chamber, said third straight line between said collimated source and said detector having a determinable third length, said third length being the same as said first length of said first straight line, said transverse scan being at a third transverse point, said third transverse point being spaced transversely from said first transverse point and from second transverse point in approximately the same transverse plane as said first and said second transverse points, said third transverse point being transversely located between said first and said second transverse point, passing gamma ray energy through said chamber and measuring the count rate of said detector at said third transverse point, and (d) correlating the transverse scans of steps (a), (b) and (c) to determine the approximate location of said surface of said bed of particulate solids in said chambers.

2. The method of claim 1 wherein steps similar to (a) through (c) are repeated at at least three longitudinally spaced apart points along said longitudinal axis of said chamber.

3. The method of claim 1 wherein step (b) is conducted at at least one other spaced apart transverse point, said fourth transverse point being spaced transversely from said first, second and third points in approximately the same transverse plane as said first, second and third transverse points.

4. The method of claim 1 wherein said transverse plane is substantially perpendicular to said central longitudinal axis of said chamber.

5. The method of claim 1 wherein in step (a), said first tranverse point is tranversely located on one side of said surface of said bed of said solids, and in step (b), said second transverse point is transversely located on the other side of said surface of said bed of said solids.

* * * * *